UNITED STATES PATENT OFFICE.

EMIL COLLETT AND MORITZ ECKARDT, OF CHRISTIANIA, NORWAY.

PROCESS OF MANUFACTURING NITRATE FERTILIZERS.

985,781.

Specification of Letters Patent. Patented Mar. 7, 1911.

No Drawing.

Application filed April 30, 1910. Serial No. 558,679.

*To all whom it may concern:*

Be it known that we, EMIL COLLETT and MORITZ ECKARDT, subjects of the King of Norway, residing a Christiania, Norway, have invented certain new and useful Improvements in Processes of Manufacturing Nitrate Fertilizers; and we do hereby declare the following to be a full, clear, and exact description of the invention, such as will enable others skilled in the art to which it appertains to make and use the same.

Our invention has for its object to provide a process for manufacturing nitrate fertilizers.

Calcium cyanamid possesses certain properties which have a somewhat unfavorable influence upon the value of the substance as a fertilizer, and it would be of very great advantage, if this important nitrogen carrier could be transferred into a form, which could be easily and advantageously sold as a fertilizer, and several attempts have been made to that effect. These attempts however have proved more or less inefficient, because they have been based upon the coöperation and consumption of comparatively expensive substances and also because they do not provide any profitable use of the valuable content of calcium in the calcium cyanamid. Thus it has been proposed to produce ammonia from the calcium cyanamid by means of decomposition with water and absorbing the ammonia in sulfuric acid, whereby the nitrogen is utilized as sulfate of ammonia. No use has been made either for the lime remaining in the residuum after the decomposition or for the nitrogen residues contained in the residuum. By such process the price of the product is increased by the introduction of the sulfuric acid and indirectly by the loss of the lime and the nitrogen contained in the residuum. It might be advantageous to utilize the lime and small quantities of nitrogen contained in the residuum for the production of nitrate of lime by adding nitric acid. In this case however nitric acid must be procured, which in most cases would be much too expensive for this use.

It is now generally recognized, that the nitrogen contained in nitrates, for instance nitrate of lime, is considerably more valuable than the nitrogen of cyanamid and accordingly it would be very advantageous to transfer the cyanamid into nitrate of lime, if this could be effected without the introduction of foreign substances and without admixtures, which may be expensive and may also introduce undesirable impurities into the product.

The present invention relates to a process, by which the desired transformation of calcium cyanamid into nitrate of lime is obtained by a novel combination of methods, which are in themselves already known, without use of other substances than those contained in the raw materials, the products obtained at the different steps of the process being utilized in such a way as to incorporate all the lime and nitrogen contained in the calcium cyanamid in the nitrate of lime produced.

The process is carried out in the following way: The nitrogen contained in the calcium cyanamid is transformed into ammonia in a well known manner by decomposition of the cyanamid, preferably for instance by heating the same with aqueous nitrate of lime. This ammonia is then oxidized and transformed into nitrogen oxids or nitric acid, which is obtained in such a quantity as will theoretically correspond to the amount of lime present in the residuum after the decomposition of the cyanamid. This residuum is then subsequently treated with the nitric acid obtained. From the solution of nitrate of lime thus obtained solid nitrate of lime is then produced by known means, whereby the whole amount of the lime employed in manufacturing the cyanamid as well as of the nitrogen used is utilized as solid nitrate of lime. The small quantity of nitrogen left in the decomposition residuum being hereby also utilized.

We claim:—

1. The process of converting calcium cyanamid into nitrate of lime which consists in decomposing calcium cyanamid to produce ammonia, transforming the ammonia into nitrogen oxids or nitric acid, dissolving the residuum in the nitrogen oxids or nitric acid thereby obtaining a product containing nitrate of lime, all the nitrogen and all the lime contained in the original calcium cyanamid.

2. The process of converting calcium cyanamid into nitrate of lime which comprises transforming the nitrogen contained in the cyanamid, into ammonia, transforming the ammonia into nitrogen oxids or nitric acid, reacting upon the residuum of the decomposition of the cyanamid with the nitrogen oxids or nitric acid obtained, and thereby producing a product containing nitrate of lime and all the lime and all the nitrogen contained in the original cyanamid.

3. The process of converting calcium cyanamid into nitrate of lime which comprises transforming nitrogen contained in the cyanamid into nitric acid, and reacting therewith upon the residue to form nitrate of lime.

In testimony that we claim the foregoing as our invention, we have signed our names in presence of two subscribing witnesses.

EMIL COLLETT.
MORITZ ECKARDT.

Witnesses:
HENRY BORDEWICH,
H. GUTTORMSEY.